US009792606B2

(12) United States Patent
Aubin et al.

(10) Patent No.: US 9,792,606 B2
(45) Date of Patent: Oct. 17, 2017

(54) METHOD AND SECURE DEVICE FOR PERFORMING A SECURE TRANSACTION WITH A TERMINAL

(75) Inventors: Yann-loic Aubin, Nanterre (FR);
Vincent Guerin, Nanterre (FR);
Matthieu Boisde, Nanterre (FR)

(73) Assignee: Oberthur Technologies,
Levallois-Perret (FR)

( * ) Notice: Subject to any disclaimer, the term of this patent is extended or adjusted under 35 U.S.C. 154(b) by 549 days.

(21) Appl. No.: 13/572,459

(22) Filed: Aug. 10, 2012

(65) Prior Publication Data

US 2013/0041812 A1    Feb. 14, 2013

(30) Foreign Application Priority Data

Aug. 12, 2011    (EP) .................................... 11306038

(51) Int. Cl.

| G06Q 20/22 | (2012.01) |
| G06Q 20/40 | (2012.01) |
| G07F 19/00 | (2006.01) |
| G06Q 20/32 | (2012.01) |
| G06Q 20/34 | (2012.01) |
| G07F 7/10 | (2006.01) |
| H04L 9/32 | (2006.01) |

(52) U.S. Cl.
CPC ............ *G06Q 20/40* (2013.01); *G06Q 20/32* (2013.01); *G06Q 20/3278* (2013.01); *G06Q 20/341* (2013.01); *G06Q 20/4014* (2013.01); *G07F 7/1008* (2013.01); *G07F 7/1066* (2013.01); *G07F 19/20* (2013.01); *H04L 9/3271* (2013.01); *H04L 2209/56* (2013.01)

(58) Field of Classification Search
CPC .... G06Q 20/40; G06Q 20/32; G06Q 20/3278; G06Q 20/341; G06Q 20/4014
USPC ...................................................... 705/35–46
See application file for complete search history.

(56) References Cited

U.S. PATENT DOCUMENTS

| 6,175,922 | B1 * | 1/2001 | Wang ............................ 713/182 |
| 7,165,041 | B1 * | 1/2007 | Guheen et al. ............... 705/26.1 |
| 7,716,133 | B1 * | 5/2010 | Foote et al. ..................... 705/43 |
| 8,862,097 | B2 * | 10/2014 | Brand .................... G06Q 20/10 455/410 |
| 2002/0062284 | A1 | 5/2002 | Kawan |
| 2003/0004859 | A1 * | 1/2003 | Shaw et al. ..................... 705/37 |
| 2003/0005329 | A1 * | 1/2003 | Ikonen .......................... 713/201 |
| 2005/0027543 | A1 * | 2/2005 | Labrou et al. ................... 705/1 |
| 2005/0156026 | A1 | 7/2005 | Ghosh et al. |
| 2007/0198432 | A1 * | 8/2007 | Pitroda et al. ................. 705/64 |

(Continued)

FOREIGN PATENT DOCUMENTS

| EP | 1 134 705 A2 | 9/2001 |
| EP | 1 136 962 A2 | 9/2001 |

(Continued)

*Primary Examiner* — Jagdish Patel
(74) *Attorney, Agent, or Firm* — Arent Fox LLP

(57) ABSTRACT

A method for performing a secure transaction between a secure device (2) and a terminal (4), the method being carried out by the secure device (2) and comprising the steps of:

receiving transaction data from the terminal (4),
characterized in that it comprises, before the step of receiving transaction data from the terminal (4), the steps of
obtaining transaction data entered by a user of the secure device (2), and
transmitting the transaction data to the terminal (4).

22 Claims, 2 Drawing Sheets

(56) References Cited

U.S. PATENT DOCUMENTS

2007/0262134 A1    11/2007  Humphrey et al.
2008/0040285 A1*    2/2008  Wankmueller .................. 705/67
2009/0112768 A1*    4/2009  Hammad et al. ............... 705/44
2011/0119190 A1*    5/2011  Mina .............................. 705/44

FOREIGN PATENT DOCUMENTS

EP           1 923 844 A1    5/2008
FR           2 912 855 A1    8/2008
WO         WO 01/69388 A1   9/2001
WO       WO 2008/049186 A1   5/2008

\* cited by examiner

METHOD AND SECURE DEVICE FOR PERFORMING A SECURE TRANSACTION WITH A TERMINAL

FIELD OF THE INVENTION

The invention relates to a secure transaction between a secure device and a terminal. In a more concrete example, the invention relates to a secure transaction between a smart card and an ATM or payment terminal.

BACKGROUND OF THE INVENTION

The EMV standards define standard transactions between a smart card and a terminal. A typical EMV transaction occurs as follows:
- The smart card and the terminal (for example an ATM or a payment terminal) are brought into communication by the user of the smart card. For example, the smart card is inserted in a card reader of the terminal.
- The user of the smart card enters holder identification data, for example a PIN, through an input interface of the terminal.
- The terminal sends the entered holder identification data to the smart card.
- The smart card checks a match between the entered holder identification data and data held therein.
- In case of a match, the transaction is allowed.

Similarly, in other transaction standards, the PIN is sent from the terminal to the smart card at the beginning of the transaction for verification by the smart card.

In this type of transaction, the user may be subject to PIN theft in case a third party observes the input interface of the terminal while he enters his PIN.

A solution to this problem is provided by US 2011/0016047, wherein a password is transferred from a mobile phone of the user to an ATM by short range radio communication (NFC). Since the user does not need to enter a PIN in a user interface of the ATM, it is difficult for a third party to observe the user as he enters his PIN. However, this system uses a One Time Password provided to the user by a server. The server is in charge of checking that the password received by the ATM matches the expected password. Therefore, this solution is not compatible with the transaction standards wherein checking the holder identification data is performed by a secure device (for example a smart card) of the user.

Therefore, there exists a need for improving the security of a secure transaction between a secure device and a terminal, which is compatible with transaction standards wherein checking the holder information data is performed by the secure device.

SUMMARY AND OBJECT OF THE INVENTION

The invention provides a method for performing a secure transaction between a secure device and a terminal, the method being carried out by the secure device and comprising the steps of:
receiving transaction data from the terminal,
characterized in that it comprises, before the step of receiving transaction data from the terminal, the steps of
obtaining transaction data entered or selected by a user of the secure device, and
transmitting the transaction data to the terminal.

It is envisaged that the user of the secure device may enter the transaction data or the transaction data may be selected via the internet. For example, the transaction data, e.g. the amount may be as a result of the selection of a product using a web-site, for example an internet connection over a mobile communication network. The ordering of a product may be done on line using a mobile communication device and this information may be stored in the memory of the mobile device. A corresponding payment may be made using the mobile device before the product is given to the customer. The payment may be made, for example using a dedicated link to the retailer or for example using an NFC communication at a retailer's premises and the transaction is completed before the product is released to the customer.

In a correlated manner, the invention provides a secure device for performing a secure transaction between the secure device and a terminal, comprising:
means for receiving transaction data from the terminal, characterized in that it comprises:
means for obtaining transaction data entered by a user of the secure device, and
means for transmitting the transaction data to the terminal.

The transaction data may comprise holder identification data, for example a PIN. In that case, since the secure device receives transaction data from the terminal, it can perform a step of checking a match between the holder identification data received from the terminal and data held on the secure device. Therefore, the invention is compatible with common transaction standards. Moreover, in a first instance, the secure device obtains the transaction data and sends it to the terminal. Therefore, there is no need for entering the transaction data on an input interface of the terminal, and security is improved.

It is preferred that a secure action is performed only when the holder identification data from the terminal and the data held on the secure device match. For example, said secure action may be the allowing of a transaction. In the case of when the transaction is an EMV transaction, said secure action may be responding/answering to a GENERATE AC EMV command from the terminal by an ARQC (Authorization Request Cryptogram) or MC (Application Authentication Cryptogram). If the transaction is accepted a Transaction Certificate is returned when the transaction is approved. Typically the holder identification data and the data held on the secure device are PINs.

The step of transmitting the transaction data to the terminal may comprise sending the transaction data through a wireless link. The wireless link may be a Near Field Communication link.

In an embodiment, the secure device is inserted in a user device, for example a mobile phone, and the step of obtaining transaction data comprises obtaining transaction data entered on an input interface of the user device.

The step of transmitting the transaction data to the terminal may be performed only if a predetermined condition is satisfied. In an embodiment, the predetermined condition is satisfied if a predetermined time from the step of obtaining transaction data has not expired, and the predetermined condition is not satisfied if said predetermined time from the step of obtaining transaction data has expired.

The method may comprise a step of encrypting the obtained transaction data, and the step of transmitting the transaction data to the terminal may comprise transmitting the encrypted transaction data.

The step of transmitting the transaction data to the terminal may be performed in response to a command received from the terminal.

The step of receiving transaction data from the terminal may comprise receiving a Verify EMV command from the terminal.

The transaction data may comprise an amount, the method comprising, after the step of receiving transaction data from the terminal, a step of sending the amount to the terminal.

The invention also provides a computer program comprising instructions for implementing a method according to the invention when said program is executed on a computer.

The computer program may comprise a Banking Applet configured for execution in a security domain of the secure device.

The computer program may also comprise a Payment Applet, wherein:
- the Banking Applet comprises instructions for implementing the steps of obtaining transaction data entered by a user of the secure device and transmitting the transaction data to the terminal; and
- the Payment Applet comprises instructions for implementing the steps of receiving transaction data from the terminal and, the case may be, checking a match between the holder identification data of the transaction data received from the terminal and data held on the secure device.

The invention also provides a system comprising a user device, a secure device according to the invention, and a terminal.

In such a system the terminal may comprise a delivery system for delivering bank notes or an amount of credit. The amount of credit for example could be credit that is transmitted to a mobile phone system so that the user has more calling credits on the phone.

BRIEF DESCRIPTION OF THE DRAWINGS

These and other objects and features of the present invention will become clear from the following description of the preferred embodiments given with reference to the accompanying drawings, in which.

DETAILED DESCRIPTION OF PREFERRED EMBODIMENTS

Figure 1:
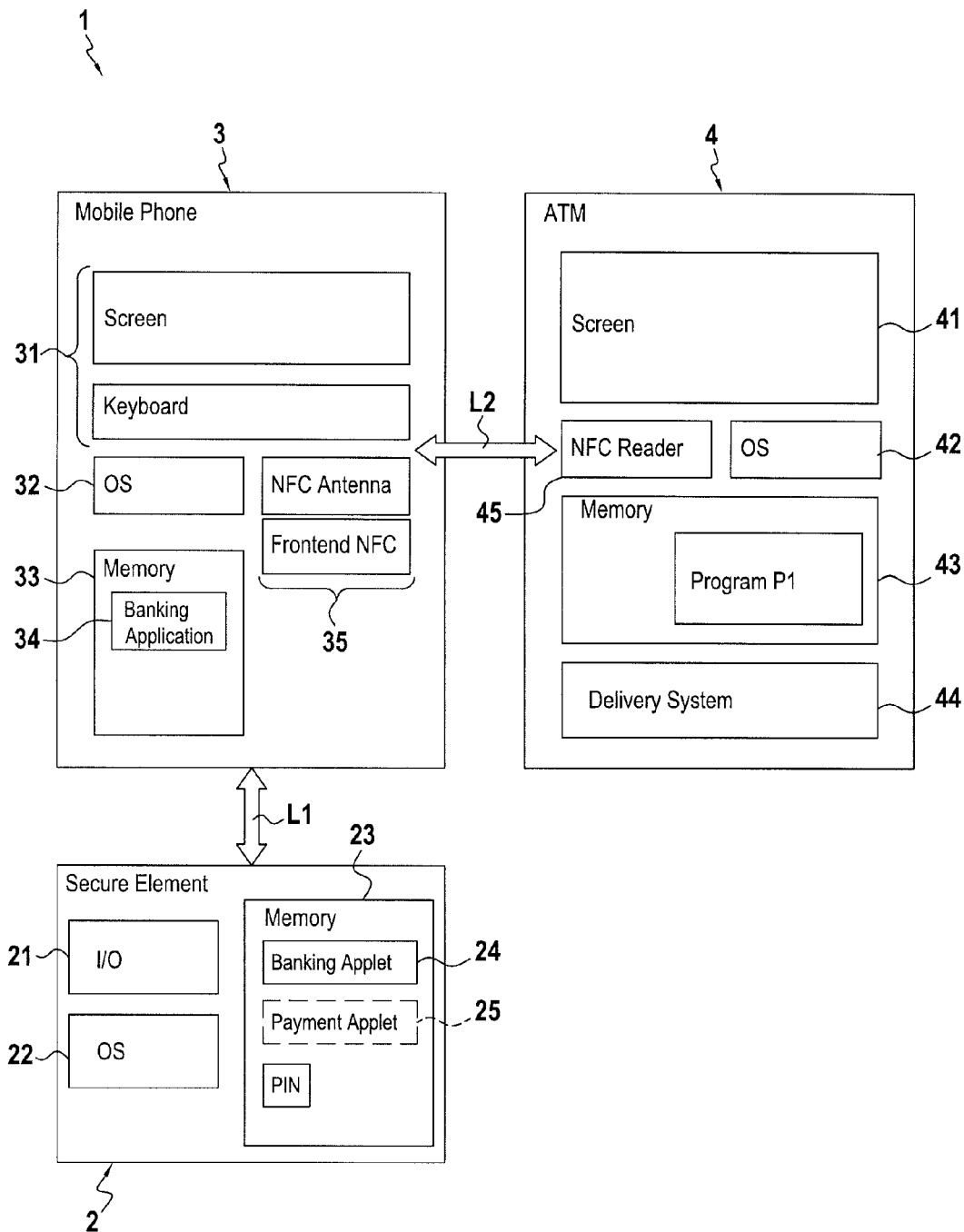
FIG. 1 shows a system according to an embodiment of the invention.

FIG. 1 shows a system 1 which comprises a secure element 2, a user device 3 and a terminal 4.

In the embodiment of FIG. 1, the user device 3 is a mobile phone, the secure element 2 is a smart card inserted in the mobile phone, and the terminal 4 is an ATM. However, the invention is not limited to this embodiment. For example, the terminal 4 may be a point-of-sale payment terminal or a web server. The user device 3 may be a personal computer, a portable electronic device, . . . . The secure element 2 may be a USB key connected to the user device 3.

The secure element 2 comprises a communication interface 21 for communication with the user device 3 through a link L1. In the example of a smart card inserted in user device 3, the link L1 is for example a standardised ISO 7816 link. As part of link L1 there is link L3, (not shown) that is based on SWP protocols and which enables communication between an NFC (Near Filed Communication) frontend 35 and the secure element 2. The secure element 2 presents the general architecture of a computer and comprises a microprocessor (not shown) which executes an Operating System 22 and which can execute a plurality of computer programs stored in a memory 23. In particular, the memory 23 stores a Banking Applet 24 and a PIN.

The Banking Applet 24 is a computer program configured for execution in a secure domain of the secure element 2. This means that the Banking Applet 24 can access data of the security domain, and that other computer programs executed by the secure element 2 cannot access the data of the security domain. The data of the security domain comprises at least a cryptographic key K. A know mechanism for implementing such a security domain is provided by the Global platform standard. However, other mechanisms may be used. The Banking Applet 24 and the use of the cryptographic key K will be described later with reference to FIG. 2.

The user device 3 presents the general architecture of a computer. It comprises a user interface 31, a microprocessor (not shown) which executes an Operating System 32 and which can execute computer programs stored in a memory 33, a communication interface (not shown) for communicating with the secure element 2 through link L1, and a communication interface 35 for communicating with the terminal 4 through link L2.

The user interface 31 comprises, for example, a screen and a keyboard or a touchscreen. The memory 34 stores a Banking Application 34, which will be described later with reference to FIG. 2.

In the example of FIG. 1, the communication interface 35 is a short range radio communication interface, for example a Near Field Communication (NFC) interface which includes a Frontend NFC and a NFC antenna. In other embodiments, the communication interface 35 is configured for communication with the terminal 4 through link L2. The link L2 may be a wire or wireless network, for example through the Internet and/or through a mobile phone network.

The terminal 4 presents the general architecture of a computer. It comprises a user interface 41, a microprocessor (not shown) which executes an Operating System 42 and which can execute computer programs stored in a memory 43, a communication interface 45 for communicating with the user device 3 through link L2, and a Delivery System 44.

The user interface 41 comprises for example a screen. A keyboard or other input interface is not necessary, but may be provided. The memory 43 stores a computer program P1, which comprises instructions for controlling the operation of the terminal 4 as will be describes later with reference to FIG. 2.

In the example of FIG. 1 wherein the terminal 4 is an ATM, the delivery system 44 delivers bank notes when a transaction is allowed.

Figure 2:
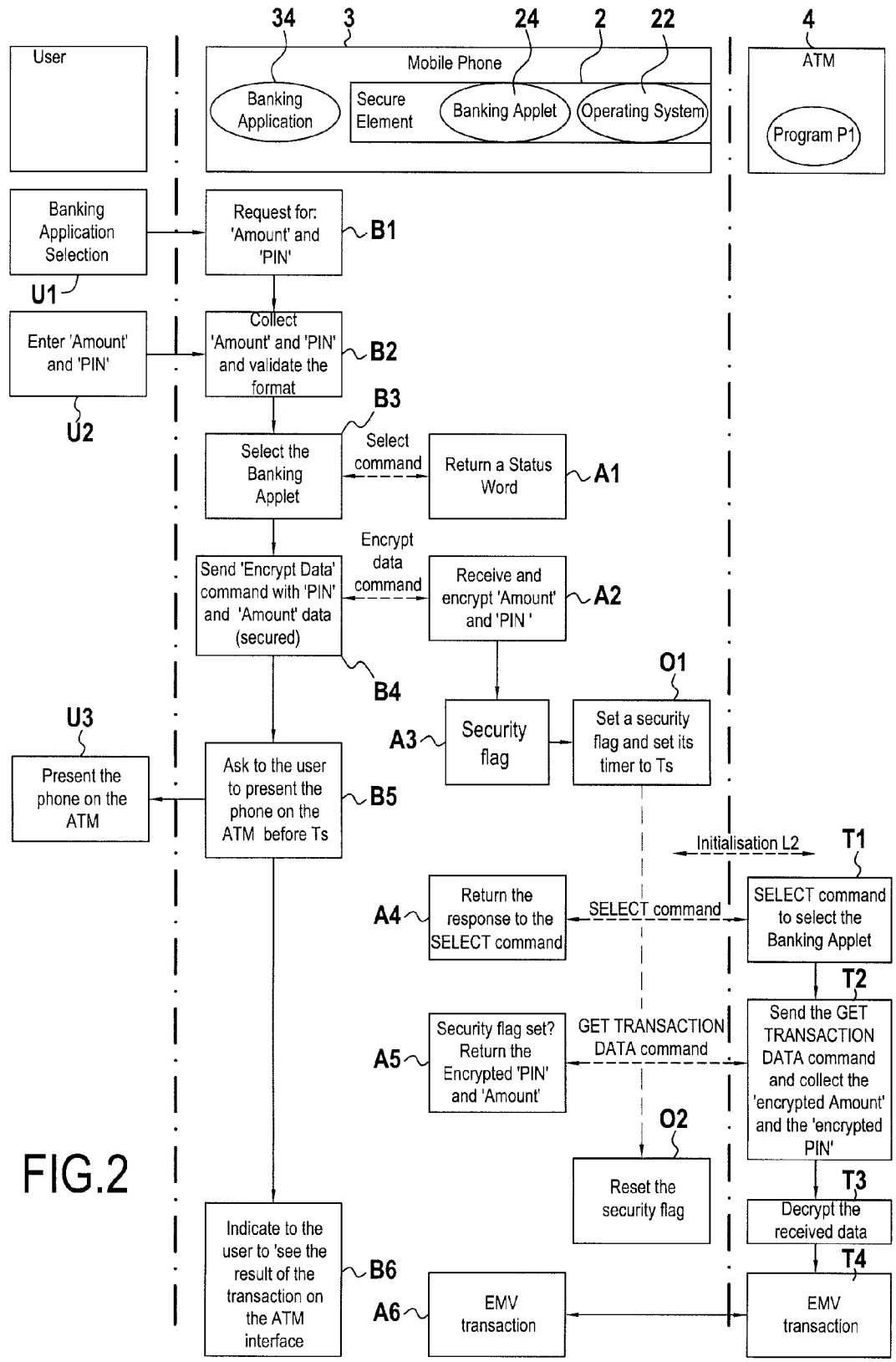
FIG. 2 is a flow diagram of a secure transaction in the system of FIG. 1.

FIG. 2 is a flow diagram of a secure transaction in the system 1 of FIG. 1.

Initially, the user of user device 3 selects and launches the Banking Application 34 (step U1). The Banking Application 34 starts at step B1 wherein it prompts the user to enter his PIN and an Amount. The user enters the PIN and Amount (step U2) which are obtained by the Banking Application 34 (step B2). In this description, the PIN and the Amount are called "transaction data".

Then, the Banking Application 34 selects the Banking Applet 24 and sent a Select command (as defined in the ISO 7816 standard) to the Banking Applet 24 (step B3). The Banking Applet 24 receives the Select command and returns a Status word which indicates that it is available (step A1).

After reception of the Status word, the Banking Application 34 sends a command to the Banking Applet 24 (step B4), called "Encrypt Data command" in this description. The Encrypt Data command is a message which includes the PIN and the Amount received at step B2.

At step A2, the Banking Applet 24 obtains the Encrypt Data command, and determines encrypted transaction data. In other words, the Banking Applet 24 encrypts the PIN, the Amount with the cryptographic key K. For example, the encrypted transaction data is determined by a known public key algorithm.

Then, the Banking Applet 24 asks the Operating System 22 to set a security flag and to initiate a timer to a predetermined time TS (step A3). The Operating System 22 sets the security flag and initiates the timer at step O1.

Meanwhile, after step B4, the Banking Application 34 displays a message on user interface 31, which asks the user to present the user device 3 to the terminal 4 before TS (step B5). Here, we assume that the user presents the user device 3 to the terminal 4 (step U3) and the transaction proceeds as described below. However, in case the user does not present the user device 3 to the terminal 4 before TS, the Banking Application 34 indicates on user interface 31 the end of the allowed time.

When the user presents the user device 3 to the terminal 4, the link L2 is initialised. Consequently, the terminal 4 is capable of communicating with the Banking Applet 24, through Link 3 by way of Links L1 and L2.

After initialisation of link L2, the terminal 4 selects the Banking Applet 24 (steps T1 and A4).

Then, the terminal 4 sends a command to the Banking Applet 24 (step T2), called "Get Transaction Data command" in this description. In response to the reception of the Get Transaction Data command, the Banking Applet 24 verifies whether the security flag is set.

If the user has waited too long before presenting the user device 3 to the terminal 4, the timer TS has expired and the Operating System 22 has reset the security flag before step T2. In that case, the Banking Applet 24 does not respond to the Get Transaction Data command or respond with an error message, and the transaction is not allowed.

In the example of FIG. 2, we assume that the user has presented the user device 3 to the terminal 4 early enough. In that case, the security flag is set and the Banking Applet 24 responds to the Get Transaction Data command by sending the encrypted transaction data of step A2 (that is the encrypted PIN and/or the encrypted Amount) to the terminal 4 (step A5). In another embodiment, instead of being encrypted during step A2, the PIN and/or the amount may be encrypted upon reception of the Get Transaction Data command by the secure element 2.

Then, the terminal 4 decrypts the encrypted transaction data and obtains the PIN and the Amount (step T3). Meanwhile, after step A5, the Operating System 22 resets the security flag (step O2).

After step T3, the terminal 4 has obtained the PIN and the Amount entered by the user, and is connected to the secure device 2 through links L1 and L2, using a SWP protocol (Single Wire Protocol) involving Link L3. Therefore, a classical transaction can proceed between the terminal 4 and the secure device. More precisely, the terminal 4 sends the PIN and the Amount to the Banking Applet 24 (step T4). At step A6, the Banking Applet 24 receives the PIN and Amount from the terminal 4 and checks a match between the received PIN and the PIN held in memory 23. In the case of a match, the transaction may be allowed, otherwise the transaction is not allowed. When the transaction is allowed said amount is sent cryptographically encrypted and signed to the terminal 4 by the secure element 2 in order to complete the transaction. Then, at step B6, the Banking Application 34 displays a message on user interface 31 which tells the user to see the results of the transaction on the interface 41 of terminal 4.

A typical transaction may be a standard EMV transaction. In such a situation:

The PIN may be sent from the terminal 4 to the Banking Applet 24 in a VERIFY EMV command.

The amount is sent back from the terminal 4 to the secure element 2 in a GENERATE AC EMV command.

In the case that the transaction is allowed, said amount is sent cryptographically encrypted and signed to the terminal 4 by the secure element 2 to complete the transaction in a response to a GENERATE AC command for example in the ARQC (Authorization Request Cryptogram) or MC (Application Authentication Cryptogram) data.

In the case the transaction is not allowed said amount is sent cryptographically encrypted and signed to the terminal 4 by the secure element 2 to refuse the transaction in a response to a GENERATE AC command for example in the TC (Threshold Cryptogram) data.

Finally, in case the transaction is allowed, the delivery system 44 of terminal 4 delivers bank notes corresponding to the entered Amount.

In FIG. 2, steps B1 to B6 are performed by the user device 3 when it executes the Banking Application 34. Similarly, steps A1 to A6 are performed by the secure device 2 when it execute the Banking Applet 24, and steps O1 and O2 are performed by the secure device 2 under control of the Operating System 22. Steps T1 to T4 are performed by the terminal 4 when it executes Program P1.

As described above, in steps T4 and A6, the PIN is sent from the terminal 4 to the secure device 2 of the user for verification. Thus, the invention is compatible with transaction standards such as the EMV standards.

Furthermore, the user does not need to enter his PIN on a user interface of the terminal 4. In contrast, the user enters his PIN on the user interface 31 of the user device 3 (steps U2 and B2). Therefore, the risk of PIN theft is reduced. Moreover, since the PIN is sent to the terminal 3 by the Banking Applet 24 which executes in a security domain, preferably after encryption, security is improved.

In the example of FIG. 2, the Banking Applet 24 has two functions: Obtaining and transmitting the encrypted PIN and Amount to the terminal 4 (steps A1 to A5), and checking the PIN for allowing the transaction (step A6).

In another embodiment, the memory 23 of the secure device also comprises a Payment Applet 25. In this embodiment, the Banking Applet 24 is in charge of obtaining and transmitting the encrypted PIN and Amount to the terminal 4 and performs steps A1 to A5 as in the example of FIG. 2. However, in step T4, the terminal 4 interacts with the Payment Applet 25 for allowing the transaction. In other words, step A6 of FIG. 2 performed by the Banking Applet 24 is replaced by a similar step (not shown) performed by the Payment Applet 25. One advantage of this embodiment is that the Payment Applet 25 may be certified separately as a standard EMV payment applet.

The banking applet 24 and or the Payment applet 25 may be compliant with the JavaCard Standard. In this case, the operating system 22 of the secure element comprises a JavaCard virtual machine. The banking applet 24 may be replaced by another subroutine having another computational structure than an applet or/and in another computing language than Javacard.

The invention has been described above with reference to a PIN. However, the invention is not limited to the use of a PIN and other type of holder identification data may be used, for example fingerprint or iris image.

The invention has been described above with reference to an ATM which delivers bank notes. However, the terminal of the invention is not limited to an ATM and other operations rather than delivering bank notes may be performed by the delivery system 44 when the transaction is allowed.

It is to be understood that the above embodiments have been provided only by way of exemplification of this invention, and that further modifications and improvements thereto, as would be apparent to persons skilled in the relevant art, are deemed to fall within the broad scope and ambit of the present invention described. Furthermore where individual embodiments are discussed, the invention is intended to cover combinations of those embodiments as well.

The invention claimed is:

1. A computer implemented method of performing a secure transaction between a user payment secure device and a delivery terminal, the method comprising:
receiving, via a processor of the user payment secure device, data related to the secure transaction conducted between the user payment secure device and the delivery terminal, the data comprising transaction requester identification information, the user payment secure device being inserted in a user communication device, and wherein receiving the data related to the secure transaction comprises obtaining data entered on an input interface of the user communication device:
establishing a link between the user payment secure device and the delivery terminal;
transmitting the data to the delivery terminal via the established link; and
receiving, by the user payment secure device, user identification data from the delivery terminal to compare with the transaction requester identification information received before the establishment of the link and the transmission of the data for validating the secure transaction so that the delivery terminal performs a delivery corresponding to the data related to the secure transaction without the user entering the data related to the secure transaction on the delivery terminal.

2. The method according to claim 1, wherein the link comprises a wireless link.

3. The method according to claim 1, wherein the step of transmitting the data to the delivery terminal is performed only if a predetermined condition is satisfied.

4. The method according to claim 3, wherein the predetermined condition is satisfied if a predetermined time from the step of obtaining transaction data has not expired, and the predetermined condition is not satisfied if said predetermined time from the step of obtaining transaction data has expired.

5. The method according to claim 1, encrypting the data related to the secure transaction, wherein transmitting the data to the delivery terminal comprises transmitting the encrypted data.

6. The method according to claim 1, wherein transmitting the data to the delivery terminal is performed in response to a command received from the delivery terminal.

7. The method according to claim 1, wherein receiving the user identification data from the delivery terminal comprises receiving a Verify EMV command from the delivery terminal.

8. The method according to claim 1, wherein the data related to the secure transaction comprise an amount, the method further comprises sending the amount to the delivery terminal.

9. The method according to claim 1, wherein the delivery terminal comprises a payment terminal, an ATM or a web server.

10. The method according to claim 1, wherein the transaction requester identification information comprises at least one of a PIN code, a fingerprint and an iris image.

11. The method according to claim 1, wherein transmitting the data to the delivery terminal comprises transmitting the data via short range telecommunications means.

12. The method according to claim 1, wherein the secure transaction includes a delivery by the delivery terminal based on the data.

13. The method according to claim 1, wherein receiving the user identification data from the delivery terminal comprises receiving transaction data and a transaction requester identification data verification command from the delivery terminal.

14. A non-transitory computer usable medium storing computer executable code for performing a secure transaction between a user payment secure device and a delivery terminal, the computer executable code causing at least one computer of the user payment secure device to:
receive data related to the secure transaction conducted between the user payment secure device and the delivery terminal, the data comprising transaction requester identification information, the user payment secure device being inserted in a user communication device, and wherein receiving the data related to the secure transaction comprises obtaining data entered on an input interface of the user communication device:
establish a link between the user payment secure device and the delivery terminal;
transmit the data to the delivery terminal via the established link; and
receive, by the user payment secure device, user identification data from the delivery terminal to compare with the transaction requester identification information received before the establishment of the link and the transmission of the data for validating the secure transaction so that the delivery terminal performs a delivery corresponding to the data related to the secure transaction without the user entering the data related to the secure transaction on the delivery terminal.

15. The computer usable medium according to claim 14, further comprising code for:
executing in a secure domain of the user payment secure device including obtaining data entered by a user of the user payment secure device and transmitting the data related to the secure transaction to the delivery terminal; and
receiving the user identification data from the delivery terminal.

16. A user payment secure device for performing a secure transaction between the user payment secure device and a delivery terminal, comprising at least one processor configured for:
receiving data related to the secure transaction conducted between the user payment secure device and the delivery terminal, the data comprising transaction requester identification information, the user payment secure device being configured to be inserted in a user communication device, and wherein receiving the data related to the secure transaction comprises obtaining data entered on an input interface of the user communication device;

establishing a link between the user payment secure device and the delivery terminal;

transmitting the data to the delivery terminal via the established link if a predetermined time from the receiving of data has not expired;

receiving, by the user payment secure device, user identification data from the delivery terminal to compare with the transaction requester identification information received before the establishment of the link and the transmission for validating the secure transaction so that the delivery terminal performs a delivery corresponding to the data related to the secure transaction without the user entering the data related to the secure transaction on the delivery terminal.

17. The user payment secure device according to claim 13, further comprising a secure element including the at least one processor.

18. The user payment secure device according to claim 17, wherein the secure element comprises a smart card or a USB key.

19. The user payment secure device according to claim 16, wherein receiving the user identification data from the delivery terminal comprises receiving transaction data and a transaction requester identification data verification command from the delivery terminal.

20. A system, comprising: a user communication device; a delivery terminal; and a secure device configured for:

receiving, via a processor of the secure device, data related to the secure transaction conducted between the user payment secure device and the delivery terminal, the data comprising transaction requester identification information, the user payment secure device being configured to be inserted in a user communication device, and receiving the data related to the secure transaction comprises obtaining data entered on an input interface of the user communication device, establishing a link between the user payment secure device and the delivery terminal, transmitting the data to the delivery terminal via the established link, and receiving, by the user payment secure device, user identification data from the delivery terminal to compare with the transaction requester identification information received before the establishment of the link and the transmission for validating the secure transaction so that the delivery terminal performs a delivery corresponding to the data related to the secure transaction without the user entering the data related to the secure transaction on the delivery terminal.

21. The system according to claim 20, wherein the delivery terminal comprises a delivery system for delivering bank notes or an amount of credit.

22. The system according to claim 21, wherein the amount of banknotes or credit to be delivered is entered by the user, encrypted and sent to the delivery terminal.

* * * * *